United States Patent [19]
Votsch et al.

[11] Patent Number: 6,030,153
[45] Date of Patent: Feb. 29, 2000

[54] MILLING TOOL WITH AXIAL ADJUSTMENT

[75] Inventors: Wolfgang Votsch, Rangendingen; Thomas Schneider, Hirrlingen; Siegfried Bohnet, Mossingen, all of Germany

[73] Assignee: Walter AG, Germany

[21] Appl. No.: 09/097,192

[22] Filed: Jun. 12, 1998

[30] Foreign Application Priority Data

Jun. 15, 1997 [DE] Germany ............................ 197 25 219

[51] Int. Cl.⁷ ...................................................... B23C 5/24
[52] U.S. Cl. .................................. 407/36; 407/41; 407/49; 407/53
[58] Field of Search ................................... 407/35, 36, 37, 407/38, 39, 41, 43, 44, 45, 49, 53

[56] References Cited

U.S. PATENT DOCUMENTS

| | | | |
|---|---|---|---|
| 3,217,384 | 11/1965 | Wirfelt | 407/36 |
| 3,501,822 | 3/1970 | Williams | 407/39 |
| 3,660,879 | 5/1972 | Erkfritz | 407/41 |
| 3,847,555 | 11/1974 | Pegler et al. | 407/36 |
| 5,102,268 | 4/1992 | Mitchell | 407/36 |
| 5,102,269 | 4/1992 | Arai et al. | 407/41 |

*Primary Examiner*—Andrea L. Pitts
*Assistant Examiner*—Henry W. H. Tsai
*Attorney, Agent, or Firm*—Leydig, Voit & Mayer, Ltd.

[57] ABSTRACT

A milling tool (1) has at least one insert seat (14) which is adjustable in the axial direction. Provided for this purpose as an insert seat is a cartridge (47) which is received in a groove (41) but does not have a supporting face for the bottom face of the insert (25). The insert (25) consequently rests on a side wall (42) of the groove (41). As a result, the insert seat (14) is formed by a combination of the plane face of the tool body (2) and bearing faces (51, 52) of the cartridge (47). This achieves a particularly small installation space (close tooth spacing) and rigid mounting of the insert (25).

13 Claims, 3 Drawing Sheets

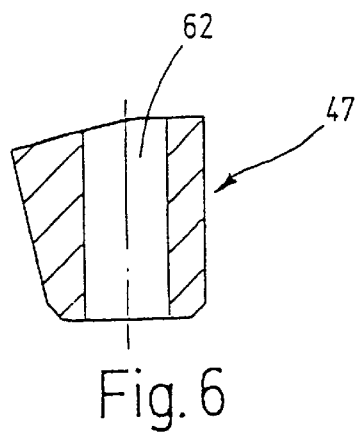
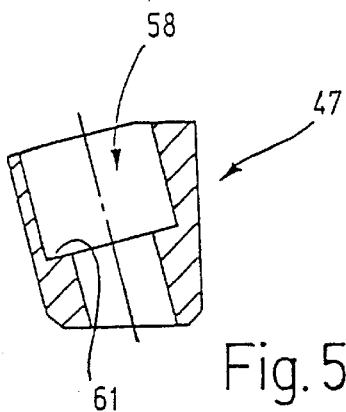
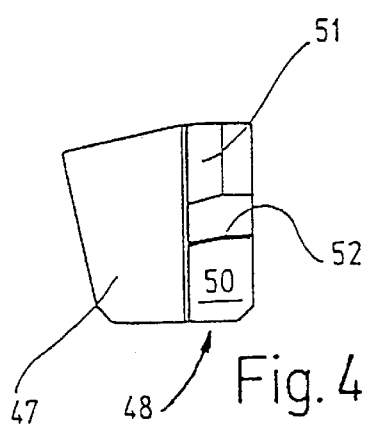
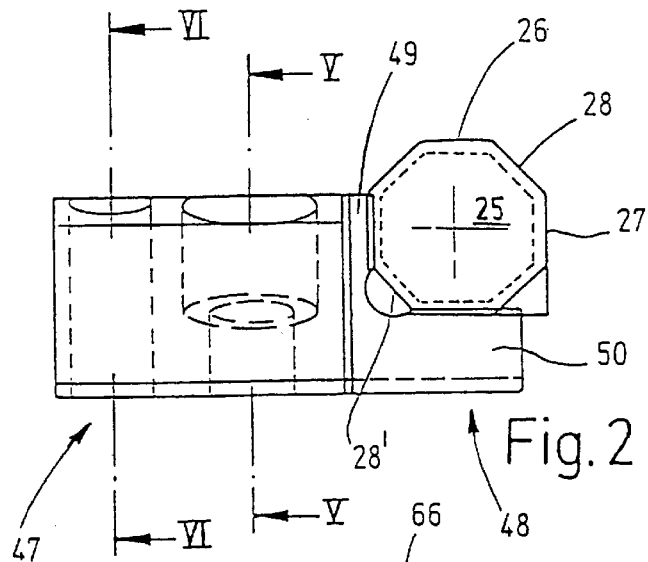
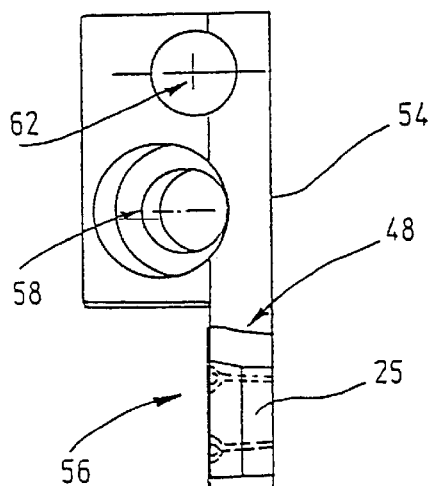
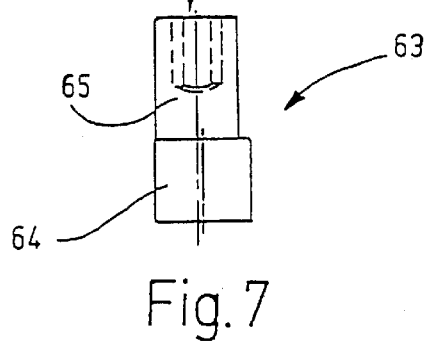
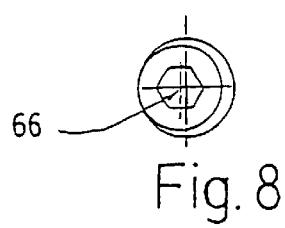

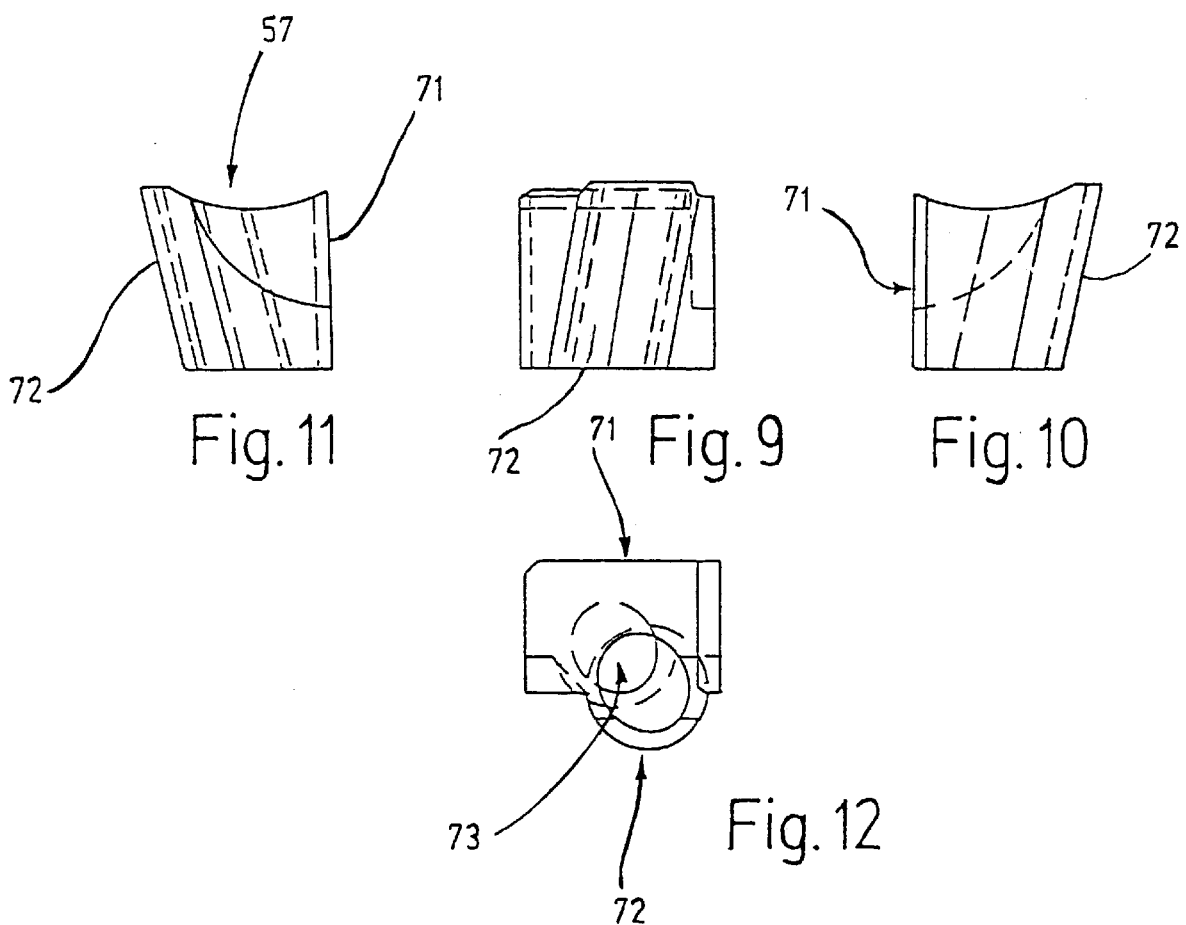

MILLING TOOL WITH AXIAL ADJUSTMENT

FIELD OF THE INVENTION

The invention relates to a milling tool, in particular a plain milling tool, having the features of the preamble of patent claim 1.

BACKGROUND OF THE INVENTION

Particularly milling tools which are fitted with exchangeable indexable inserts have a tool body on which one or more insert seats for corresponding indexable inserts are formed. It is frequently required that individual indexable inserts are adjustable in their axial position. This measure serves, for example, the purpose of setting a desired number of smoothing cutting edges. In the case of a plain miller, the circumferential cutting edges of which operate at a high metal removal rate as roughing cutting edges for example, it has proved to be expedient for example for only one smoothing cutting edge to be provided for three to five roughing cutting edges in order to obtain a good smoothing finish. It is therefore not at all necessary for all the inserts to be fastened to the tool body in an axially adjustable manner. It is sufficient if one or a few inserts are held by a correspondingly adjustable mounting.

Known from U.S. Pat. No. 3,802,043, which discloses the features of the preamble of patent claim 1, is a milling tool which has a recess for receiving an indexable insert to be adjustably held. Arranged in the recess is a cartridge which has an insert seat. The cartridge, which has a thickness exceeding twice the thickness of the indexable insert, has both a bearing face for the bottom face of the indexable insert and lateral bearing faces. With its rear face, the cartridge bears against a corresponding planar bearing face of the recess of the tool body. A wedge presses the indexable insert into the insert seat of the cartridge and consequently presses the cartridge against the opposite wall of the recess. Serving for adjusting the cartridge in the longitudinal direction is a rotatable cam, which bears with its cam face against an end face of the cartridge.

The cartridges require a certain installation space, with the result that the tooth spacing between successive indexable inserts cannot go below a certain minimum spacing. This restricts the possible number of teeth and consequently the metal removal rate of the milling tool.

In particular in the case of milling tools on which only some of the indexable inserts are to be adjustably mounted, the increased tooth spacing caused by the cartridges has a detrimental effect. If the insert seats for non-adjustably mounted indexable inserts are provided directly on the tool body, the tooth spacings tend to be relatively small. However, in order to achieve a uniform tooth spacing, they must be set to the large tooth spacing dictated by the small number of cartridges.

It is likewise known from the above mentioned U.S. Pat. No. 3,802,043 to mount indexable inserts adjustably without any cartridge. For this purpose there is provided on the tool body an insert seat which has a plane face for the bottom face of the indexable insert. The indexable insert bears laterally with its free face directly against the above mentioned cam. For fastening, the indexable insert is braced by a wedge against the plane face.

In the case of this arrangement, the exact alignment of the insert is dependent on the alignment of the cam. Even slight backlash about its axis of rotation or a small angular error of its axis of rotation or worn points on the insert at the point of contact with the cam may under certain circumstances cause the insert to be wrongly adjusted.

Known from German Patent 674,112 is a cutter head which has cutters mounted in an axially adjustable manner. These are in engagement with the head of an eccentric bolt, the shank of which is seated in a bore of a basic tool body. The cutters are of a correspondingly elongate design and offer sufficient installation space. However, this measure cannot be readily transferred to indexable inserts.

Known from DE 35,30,745 A1 is a cutter head which has a plurality of inserts respectively mounted in cartridges. The cartridges are adjustably held. For this purpose, the cartridges have corresponding insert seats, with the result that the cutting forces are transferred from the corresponding insert initially to the cartridge and from the latter to the tool body. This requires a robust design of the cartridges and consequently a considerable installation space.

OBJECTS AND SUMMARY OF THE INVENTION

On this basis, it is the object of the invention to provide a milling tool which has at least one adjustable insert seat and a small tooth spacing and which allows a precise adjustment of the insert.

This object is achieved by a milling tool which has the features of patent claim 1.

The milling tool according to the invention has a generally circular tool body on which the adjustably held insert is directly clamped. For this purpose, the tool body is provided with a recess and/or a radial projection, which recess or projection has a seating face facing the bottom face of the insert. The insert bears with its base face against this seating face and is pressed against the latter by a wedge. The wedge pressing against the cutting face of the insert is supported on an opposite face. Instead of the wedge, other fastening means may also be used.

For adjusting the desired position of the insert there serves a special cartridge (receptacle), which is in bearing contact only with free faces of the insert, but not with its bottom face. The direct contact between the bottom face of the insert and the corresponding bearing face of the tool body gives rise to a direct, diversion-free flux of force from the insert into the tool body and vice versa. This achieves very high rigidity and a precise mounting of the indexable insert with respect to the influence of cutting forces.

The adjustment of the indexable insert takes place by means of the cartridge in a precise way. The cartridge guides the indexable insert bearing exactly against at least two side or free faces at an angle with respect to one another and prevents tilting or turning of the indexable insert during the adjusting operation. The cartridge can be precisely guided on a corresponding bottom face of the recess of the tool body. The guidance of the indexable insert is correspondingly precise during adjustment. Angular errors, such as could occur in the case of adjustable insert seats without cartridges, are thereby reduced to a minimum or excluded entirely.

With an appropriate design, the special cartridge makes possible different expedient forms of indexable insert. The avoidance of direct contact between the indexable insert and an actuating member, for example a cam, has the effect that the actual form of the indexable insert is of no great significance for its adjustment, by contrast with known adjustable insert seats without cartridges.

The contact between the bearing faces of the cartridge and the side faces of the indexable insert may be restricted to relatively small face regions, which are preferably at points of the insert which are not subjected to any wear, or at least only slight wear, when the insert is clamped in differently (indexed). Consequently, the insert may be designed as an indexable insert, a precise adjustment being ensured in all installation positions, irrespective of the state of wear.

The milling tool according to the invention also makes close tooth spacing possible. No space is required in the circumferential direction for the cartridge between the bottom face of the indexable insert and the bearing face of the tool body. The adjustable insert seat therefore does not require any more space in the circumferential direction than a non-adjustable insert seat. Consequently, by the special design of the insert seat and of the cartridge, the invention combines the advantages of clamping without cartridges with the advantages which a cartridge offers with regard to adjustment accuracy.

The receptacle preferably has both in the axial direction and in the radial direction in each case at least one bearing face region, which comes into bearing contact with corresponding side or free faces of the insert and consequently fixes the latter in their position. However, by contrast with conventional cartridges, the receptacle is open in the transverse direction or, with respect to the tool body, is open in the circumferential direction in the region of the insert seat of the indexable insert. The receptacle consequently adjustably determines the axial position of the insert. The radial position and the rotational position of the insert are not adjustably fixed by the receptacle. In the circumferential direction, the seating face of the tool body fixes the position.

Since the insert is held unrotatably in the receptacle, the rotating position is determined by the bearing of the said receptacle by a preferably planar bearing face against the bottom of the recess. During the adjustment of the insert, the latter is axially displaced by means of the receptacle. Serving for this purpose is an adjusting device acting on the receptacle. This involves the insert sliding with its bottom face on the corresponding bearing face of the recess. However, it can neither turn nor tilt, because the receptacle fixes the position of the insert by its radially extending bearing face and by its axially extending leg reaching behind said insert.

An eccentric screw, a cam, a wedge or the like may be used as the adjusting device. What is essential here is that an adequate actuating force can be applied in a relatively sensitive manner. To make precise adjustment possible, it is also required here that the receptacle can be held in a state in which, although it can be adjusted by actuating forces, it otherwise retains its position. This is achieved by a holding screw which is arranged essentially radially and reaches through the receptacle by means of a corresponding opening. The holding screw is supported on the receptacle via a resilient means. The resilient means permits partial loosening of the holding screw, reducing the holding force, with the result that a defined displacement of the receptacle becomes possible.

Preferably serving for fastening the insert is a wedge which presses the insert by its bottom face against a side wall of the recess of the tool body. The wedge preferably operates in a direction which is oriented transversely with respect to the adjusting direction of the receptacle. This is achieved in the case of a plain miller by a wedge to be driven in the radial direction between the insert and the opposite wall face. The drawing in and holding of the wedge is effected by a suitable, preferably radially arranged screw.

Further details and advantages of the present invention emerge from subclaims, the following description and the associated drawings.

An exemplary embodiment of the invention is represented in the drawing, in which:

BRIEF DESCRIPTION OF THE DRAWINGS

FIG. 2 shows a receptacle, provided with an insert, for the milling tool according to FIG. 1, in a frontal view;

FIG. 3 shows the receptacle with the insert according to FIG. 2, in a plan view;

FIG. 4 shows the receptacle according to FIGS. 2 and 3, without insert, in a frontal view;

FIG. 5 shows the receptacle according to FIG. 2, in a representation of a section taken along the line V—V in FIG. 2;

FIG. 6 shows the receptacle according to FIG. 2, in a representation of a section taken along the line VI—VI in FIG. 2;

FIG. 7 shows an eccentric screw for the positioning of the receptacle on the tool body which can be seen from FIG. 1, in side view;

FIG. 8 shows the eccentric screw according to FIG. 7, in plan view;

FIG. 9 shows a clamping wedge for fastening the insert on the tool body, in frontal view;

FIGS. 10 and 11 show the clamping wedge according to FIG. 9, in a side view from the left and right, respectively; and FIG. 12 shows the clamping wedge according to FIGS. 9 to 11, in plan view.

DETAILED DESCRIPTION OF THE PREFERRED EMBODIMENT

Figure 1:
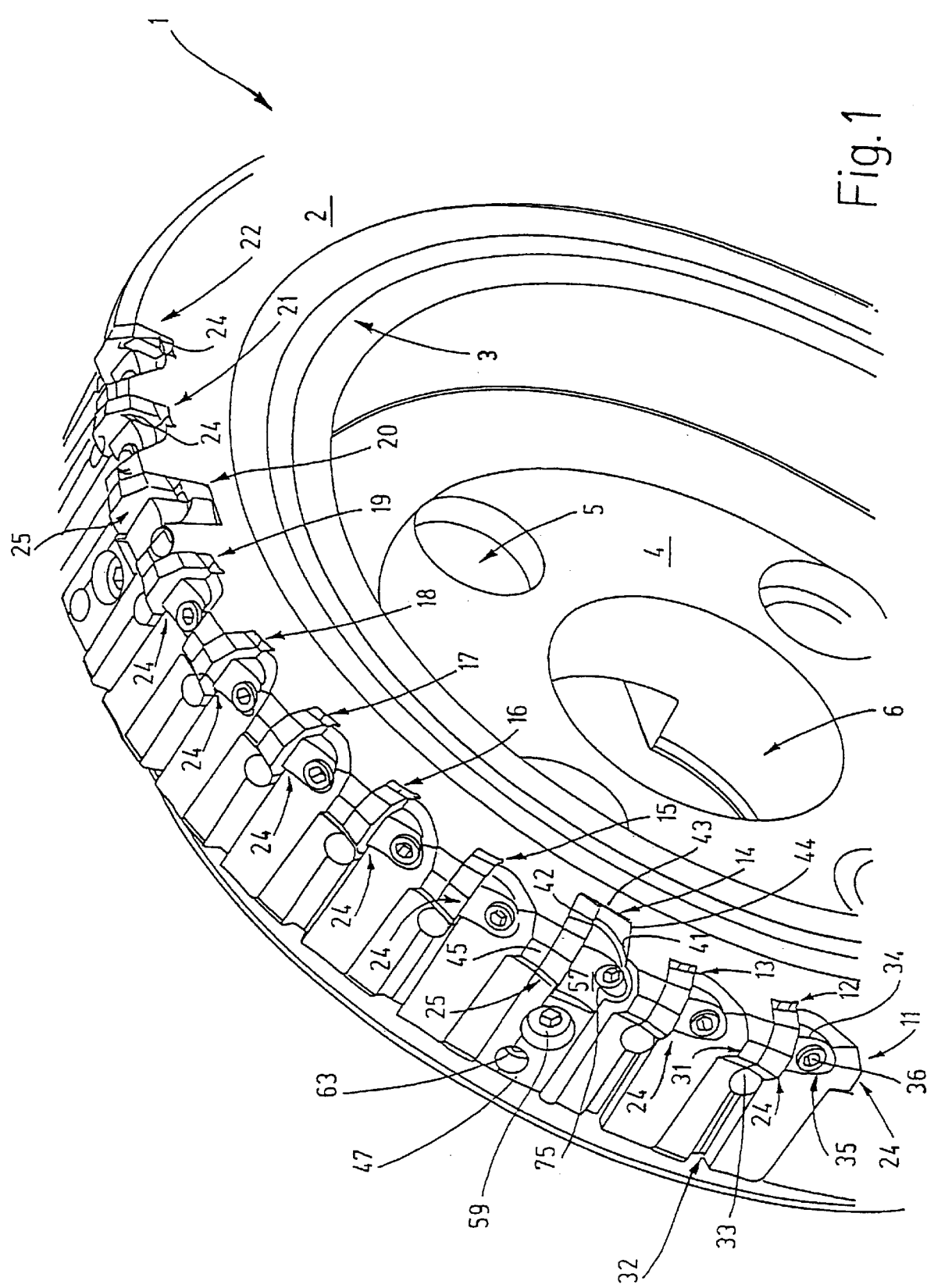
FIG. 1 shows a milling tool in a simplified perspective representation of a detail.

Illustrated in FIG. 1 is a plain miller 1, which has an approximately rotationally symmetrically designed tool body 2 with an annular outer region 3. On one side, the tool body 2 is provided with a continuous wall 4, which has a plurality of openings 5, 6 for connection to a tool spindle (of which there is no further representation). The annular outer region 3 is provided on its entire circumference with a sequence of insert seats 11 to 22, at which in each case an insert 24, 25 is held. All the inserts 24, 25 are designed identically to one another, the inserts 24 being held in fixed positions and the inserts 25 being held in adjustable positions at the respective insert seat 11 to 22. The spacings between the insert seats 11 and 22, and consequently between the inserts 24, 25 or their cutting edges, are approximately uniform over the entire circumference of the tool body 2. In particular, there is no essential or enforced difference between spacings between non-adjustable inserts 24 and spacings between adjustable and non-adjustable inserts 25, 24. Should changeable spacings be expedient, however, they can be provided.

As FIG. 2 illustrates in particular, the inserts 24, 25 have in each case a circumferential cutting edge 26 and a plane cutting edge 27. Between the circumferential cutting edge 26 and the plane cutting edge 27, oriented essentially at right angles to the latter, there is arranged a corner cutting edge 28, which in the present example is of the same length, with the result that the insert is octagonal in frontal view.

The non-adjustable insert seats 11 to 13, 15 to 19 and also 21 and 22 are designed identically to one another and explained below on the basis of the insert seat 12. For forming the insert seat 12 concerned, the tool body 2 has a radial projection 31, the radially outer contour of which coincides approximately with the contour of the insert 24. On its side facing the cutting edge 24, the radial projection 31 has a planar seating face, the surface normal of which points approximately in the circumferential direction. The exact position and alignment of the surface normal is determined by the axial and radial installation angle of the insert 24.

Formed in front of the radial projection 31 is a groove 32, the seating face of the radial projection 31 merging without any offset into the side wall of the groove 32. Arranged in the groove 32 is a stop pin 33 for the insert 24. The bottom of the groove 32 and the stop pin 33 form bearing faces for the side faces of the insert 24 and determine the position of the latter. For securely clamping the insert 24 there serves a clamp or wedge 34, which is held in a corresponding recess 35 by means of a screw 36. The wedge 34 presses the insert 24 against the seating face of the radial projection 31 and of the side wall and consequently fixes the insert 24 immovably.

Provided on the plain miller 1 are a total of four adjustable insert seats, of which the insert seats 14 and 20 are represented in FIG. 1. All the adjustable insert seats are designed identically to one another and are described below on the basis of the insert seat 14.

In the case of the insert seat 14 there is formed in the outer region 3 of the tool body 2 a groove-like recess 41, which is bounded by an approximately radially oriented wall 42, a wall 43 defining the bottom and a further wall 44 running obliquely with respect to the wall 42. The walls 42, 43, 44 are plane faces. The wall 42 forms a seating face and serves for the supporting and mounting of the insert 25 and it extends up to a radial projection 45, which coincides approximately with the radial projection 31.

Arranged in the recess 41 is a receptacle 47, which can be seen in detail from FIG. 2, is also referred to as a cartridge and the cross section of which coincides with the cross section of the recess 41, as for example FIGS. 5 or 6 show. However, the receptacle 47 has in the region of the insert 25 a portion 48 of reduced width. The thickness of the receptacle 47 is here at most as great as the thickness of the insert 25, which is to be measured between the cutting face and the bottom face. The portion 48 has here a radially extending portion 49, which mounts the insert 25 in the axial direction, and also a portion 50, which mounts the insert 25 in the radial direction. For this purpose, the portions 49, 50 are provided with corresponding first and second bearing faces 51, 52 (FIG. 4), against which the respective side faces of the insert 25 bear. The bearing faces 51, 52 essentially form a right angle with respect to one another. With a different form of insert, they may also be oriented at different angles, it being essential that each bearing face 51, 52 respectively comes into bearing contact, as required, with the corresponding side face of the insert used.

While the rear side of the receptacle 47 consequently defines a plane face 54, as FIG. 3 reveals, in the region of the insert 25 and of the portion 48 there is formed a recess 56, which serves for receiving a wedge 57, revealed by FIGS. 9 to 12. The other end of receptacle 47 is provided with a stepped fastening bore 58, which FIG. 5 reveals in particular. The fastening bore serves for receiving a fastening screw 59 (FIG. 1), the head of which is supported on an inner annular shoulder 61 of the fastening bore 58 with a resilient means interposed, for example a spring ring.

At a small distance from the fastening bore 58 there is formed in the receptacle 47 a further bore 62, which serves for receiving the eccentric bolt 63, illustrated in FIG. 7 and 8. Said eccentric bolt is seated with a cylindrical portion 64 of greater diameter in a corresponding bore, reaching through the bottom 43 of the recess 41, and extends with an eccentrically arranged cylindrical piece 65 into the bore 62. A hexagonal blind opening 66 serves for receiving a hexagon wrench and the intended turning of the eccentric bolt 63 for displacing the receptacle 47.

The wedge 57, serving for securely clamping the insert 25, has a first plane face 71, assigned to the insert 25, and a pressure face 72, lying opposite the latter and arranged at an acute angle. To be able to press the wedge between the corresponding bearing face of the groove-like recess 41 and the cutting face of the insert 25, the wedge has an oblique continuous thread 73, which is arranged inclined with respect to the radial direction. The inclination is fixed such that the frictional forces exerted on the insert 25 have both a component directed at the bearing face 52 and a component directed at the bearing face 51. This is achieved by the spacing of the bore 74 from the cutting face of the insert 25 being greater in the vicinity of the corner cutting edge 28 than in the vicinity of the opposite cutting edge 28' (FIG. 2).

The handling and adjustment of the insert 25 takes place on the plain miller 1 as follows:

Taking as a basis a fitted plain miller 1, as represented in FIG. 1, if the axial position of the insert 25 is to be changed, first of all the fastening screw 75 of the wedge 57 is loosened slightly, with the result that the insert 25 is no longer clamped entirely securely. Then the fastening screw 59 is loosened until the resilient means arranged between the screw head and the receptacle 47 relaxes slightly and the receptacle 47 is pressed against the bottom 43 only by means of the resilient force. By turning the eccentric bolt 63, the axial position of the receptacle 47 can then be changed. The adjustment is performed in this case by the receptacle 47 pushing the index 25 further outward axially. This takes place against the frictional force which is acting between the bottom face of the insert 25 and the wall 42 or between the cutting face of the insert 25 and the wedge 57. As a result, the insert 25 is pressed firmly against the bearing faces 51, 52 and turning of the insert out of its desired position is reliably prevented. Once the desired position has been reached, the fastening screws 75, 59 are tightened and the insert 25 is positioned in the way desired.

A milling tool 1 has at least one insert seat 14, which is adjustable in the axial direction. For this purpose, a cartridge 47 received in a groove 41 is provided as the insert seat but has no supporting face for the bottom face of the insert 25. The insert 25 consequently rests on a side wall 42 of the groove 41. As a result, the insert seat 14 is formed by a combination of the plane face of the tool body 2 and bearing faces 51, 52 of the cartridge 47. This achieves a particularly small installation space (close tooth spacing) and rigid mounting of the insert 25.

While the invention has been described in connection with certain exemplary embodiments, there is no intent to limit it to those embodiments. To the contrary, it is recognized that various changes and modifications to the specifically described embodiments will be apparent to those skilled in the art, and that such changes and modifications may be made without departing from the spirit and scope of the invention. Accordingly, such changes, modifications and equivalents are intended to be covered by the appended claims.

What is claimed:

1. A milling tool comprising:

a generally circular tool body having a plurality of insert seats defined thereon;

a plurality of inserts, each of the inserts having a bottom face, a plurality side faces face and a cutting face the inserts being respectively received against said insert seats;

a receptacle mounted to the tool body for adjustable movement in an adjusting direction, the receptacle having at least two bearing surfaces for respectively supporting at least two of the side faces of the insert; and a clamp mounted directly to the tool body, the clamp pressing against the cutting face of the insert to press the bottom face directly against the respective insert seat of the tool body independently of the receptacle;

wherein the clamping means is a wedge which bears with one face against the cutting face of the insert and with an opposite face against a face of the recess; wherein the insert seat of the tool body against which the bottom face of the insert bears and the opposite face of the tool body, on which the wedge is supported, form an acute angle with respect to one another; and wherein the wedge is mounted to the tool body with a radially oriented screw.

2. The milling tool as claimed in claim 1, wherein a recess is formed in the tool body, the recess having a planar side wall, wherein the receptacle is arranged in a recess of the tool body, wherein the planar side wall forms a seating face and receives the bottom face of the insert.

3. The milling tool as claimed in claim 1, wherein the receptacle has a bearing face region in bearing contact with the insert in a radial direction relative to the tool body, and the receptacle further having a bearing face region in bearing contact with the insert in an axial direction relative to the tool body.

4. The milling tool as claimed in claim 1, wherein the receptacle has no face in bearing contact with the insert in a circumferential direction relative to the tool body.

5. The milling tool as claimed in claim 1, wherein the insert supported by the clamp in the circumferential direction relative to the tool body independently of the receptacle.

6. The milling tool as claimed in claim 1, wherein the receptacle is operable to adjust the insert relative to rotation about the circumferential direction of the tool body.

7. The milling tool as claimed in claim 2, wherein the receptacle has a plane face which is in bearing contact with a bottom face of the recess of the tool body.

8. The milling tool as claimed in claim 1, wherein the receptacle is mounted to the tool body by a holding screw, which passes through the receptacle, the holding screw having a backlash allowing an adjusting movement.

9. The milling tool as claimed in claim 8, wherein the holding screw includes a head with a resilient element interposed between the head and the receptacle.

10. The milling tool as claimed in claim 1, wherein the receptacle is adjustable in a longitudinal direction an adjusting device.

11. The milling tool as claimed in claim 10, wherein the adjusting device is an eccentric bolt.

12. The milling tool as claimed in claim 10, wherein the adjusting device is a cam device.

13. The milling tool as claimed in claim 11, wherein the eccentric bolt has an eccentrically arranged portion that fits in an opening of the receptacle.

* * * * *